Patented Dec. 26, 1950

2,535,405

UNITED STATES PATENT OFFICE 2,535,405

PREPARATION AND PACKING OF CHOPPED MEATS

Robert R. Fulton, Chicago, Ill., assignor to Armour and Company, Chicago, Ill., a corporation of Illinois No Drawing. Application February 8, 1947, Serial No. 727,309

8 Claims. (Cl. 99—187)

This invention relates to the preparation and packing of comminuted meats such as ground or chopped meats. It is particularly useful in the preparation of comminuted meat packed under vacuum in glass jars, cans, and other containers.

In the packing of comminuted meats in small jars or cans for babies, children, convalescents, etc., it is common practice to place the comminuted raw meat in a container which is sealed under vacuum and then processed at a sterilizing temperature. The resulting product, which is visable through the walls of the glass jar and which becomes visible upon the opening of the can or other container, is unsatisfactory in a number of ways. The meat tends to congeal or "ball up" in the container and is surrounded by the juice from the meat. The fat tends to separate from the meat and to float in flakes upon the top of the liquid. The product has a blood-red color and is unattractive in appearance. The separation of the juices from the contracted meat mass is disadvantageous because the juices will not be reabsorbed in the meat during a subsequent cooking or heating step.

An object of the present invention is to provide a process in which meat is processed in such a manner as to provide a cooked and sterilized product in a container having the tissue thereof restored to an attractive pink color, the juices of the meat being completely absorbed therein. Yet another object is to provide a method for preparing a comminuted meat product in which the final vacuum-packed meat has the fat thereof thoroughly distributed in the meat and substantially all of the juices absorbed therein, voids, free of moisture, being formed throughout the meat body. Yet another object is to provide a process for producing a cooked meat having, instead of the gray-brown color of cooked meat, the pink color of partially restored pigments, the product containing substantially all the moisture of the original meat absorbed therein and not visible in the container, the product retaining its color upon the opening of the container for a substantial period without change.

A blood-red color in meat is due to the hemen or pigment portion of hemoglobin. The degradation of the hemen changes the color from red to a gray-brown when the hemen is substantially completely destroyed, the change in color corresponding to the degree of degradation. It is an object of my invention to so control the alteration of the hemen so that the final product has an attractive pink bloom.

In one embodiment of my invention, the meat to be processed is ground and then cooked, as by braising, and preferably without the addition of water, to a point at which there is coagulation of soluble proteins and denaturation of insoluble proteins but below the point at which the hemen of the tissues is completely destroyed. I find that very excellent results are obtained by such cooking at temperatures of 170–200° F. and for a period of 15 to 30 minutes.

After the cooking step described, the material is again ground to a finer condition so that new cut surfaces, with their capillary openings, are presented for the taking up of juices and moisture. During this grinding operation, I add the juices which were cooked out of the meat in the cooking step to the material being ground so that they are absorbed therein. At the same time, I add moisture to make up for the water evaporated in the cooking step. This is usually about 5% to 6%. The ground material thus provided absorbs most of the added water and juices, but not completely, and when the material is placed in the container there is some liquid material visible. The container is then evacuated in the usual manner and sealed and placed in a sterilizer for processing. Here, the container may be heated to 240° F. or to any other suitable temperature above 212° F. In the sterilizing or processing step, a surprising result takes place. The product, thus heated in the absence of air, tends to partially regain the color of its hemen, and an attractive pink color is obtained. The juices and moisture are absorbed by the meat and the meat expands and completely fills the container. When a glass container is used and the meat is visible, it will be noted that the meat compactly fills the entire container, having voids appearing here and there throughout the mass and with substantially no liquid being visible. Further, the fat appears to be fairly evenly distributed throughout the mass.

The product thus stands out in sharp contrast to the product commonly produced in which the meat mass contracts and forms a ball within the jar, the mass of meat being surrounded by a liquid, the meat mass being substantially the color of blood and carrying flakes of fat at the top thereof. When such a product is opened, the red color thereof rapidly darkens upon standing.

The new product produced by the present process tends to retain its attractive pink color without darkening, and the meat is firm and holds all of the juices and moisture absorbed therein so that no free liquid is visible. The meat is therefore more palatable and flavorsome and generally more satisfactory from the consumer's standpoint.

My process must be distinguished from the methods used to prepare special products like meat pastes and the like. In preparing such products the meat is first cooked thoroughly so that it is sufficiently firm to permit grinding into very fine particles. This requires cooking to such a degree that the hemen is completely degraded, and though such meat be subsequently processed under vacuum it will come out gray-tan and there will be no restoration of the hemen as is the case in my process.

My process may be varied widely depending upon the type of meat being cooked or processed. For example, in the first cooking step, temperatures between 150° and 212° F. may be employed, the time of cooking being varied. At lower temperatures, a longer period of cooking is necessary to bring about the desired coagulation without completely destroying the hemen. Much shorter periods of heating may be used at the high temperatures. At a temperature of about 190° F., usually 20 minutes are sufficient to produce the coagulation without complete destruction of the hemen.

After the cooking step, I prefer to add moisture sufficient to make up for the moisture lost in the cooking step. This is usually around 6%, but the amount will vary depending upon the particular meat being treated and the temperature and time of cooking.

The grinding or comminuting operation may be varied widely. I prefer to grind the meat in the ordinary meat grinder, using plates with holes of different sizes. For example, in the original grinding, a 1½" plate may be used, while in the second grinding, where a finer grind is desired, a ½" plate may be employed. I find that where a finer grind is made after the cooking operation, that new capillary surfaces are exposed by the finer cutting and that the material reabsorbs the juices much more effectively. Thus, when the material is placed in the jar and subjected to vacuum and a sterilizing temperature, all of the moisture and juices tend to find their way back into the meat and the meat expands to fill the container.

As specific examples, the following may be set out:

Example I

Veal meat was ground in a 1" plate and then braised at 190° F. for a period of 18 minutes. The material was then reground in a ½" plate, adding the original juice of the meat together with make-up moisture. About 6% make-up moisture was added. The reground meat was then placed in glass jars, the jars evacuated and sealed. The sealed containers were then processed at a temperature of 240° F. for a period of 1½ hours.

After the braising operation, the veal acquired a gray-tan color. This color persisted until in the final processing step within the evacuated container, the color changed to a pink, giving the appearance of a fresh and attractive product.

Example II

A piece of raw beef was trimmed free of the covering fat and connective tissue. It was ground through a 1" plate and the ground material then braised for 20 minutes at 180–190° F. The cooked meat, together with its juices, was then put through a ¾" plate of a grinding machine, and make-up water of about 6% added. The material was then placed in glass jars and closed under vacuum. After processing at a temperature of 240° F. for 1½ hours, the gray-brown appearance of the product changed to pink.

In each of the products produced in the above two examples, the liquid became thoroughly absorbed and the meat body expanded to fill the jar, with no liquid being visible when the jar was tilted or moved.

An equivalent amount of meat processed by placing the same in raw condition in a vacuum-sealed jar and processed at 240° F. resulted in a product in which the meat mass occupied only about two-thirds of the jar, the remainder thereof being liquid.

While in the foregoing specification, I have described a process and product in minute detail for the purpose of showing one embodiment of the invention, it will be understood that such details may be varied widely by those skilled in the art without departing from the spirit of my invention.

I claim:

1. In a process for the preparation and packing of chopped meats, the steps of grinding meat to a coarse size, braising the meat without the addition of water at a temperature of about 170–200° F. for a period in the neighborhood of 20 minutes, regrinding the cooked meat to a finer size, packing the cooked meat with its juices in a container, sealing the container under vacuum, and processing the meat thus in the absence of air at a temperature of about 212–240° F.

2. In a process for the preparation and packing of chopped meats, the steps of grinding meat to a coarse size, braising the meat without the addition of water at a temperature of about 190° F. for a period in the neighborhood of 20 minutes, regrinding the cooked meat to a finer size, packing the cooked meat with its juices in a container, sealing the container under vacuum, and processing the meat thus in the absence of air to a temperature of about 240° F.

3. In a process for the preparation and packing of chopped meats, the steps of grinding meat, subjecting the ground meat without the addition of water to a temperature of 150–212° F. for about 15–30 minutes, regrinding the cooked meat to a finer size, adding make-up water for the moisture lost during the cooking step and also the juices to the cooked meat, and processing the meat with said juices and make-up water in a sealed evacuated container at a temperature of about 212–240° F.

4. In a process for the preparation and packing of chopped meats, the steps of cooking comminuted meat at a temperature of 170–200° F. for a period of about 20 minutes whereby meat protein is denatured but the hemen thereof is not destroyed, packing the cooked meat with its juices in a container, sealing said container under vacuum, and processing the meat thus in the absence of air at a temperature of about 212–240° F. until the hemen thereof obtains a pink color.

5. In a process for the preparation and packing of chopped meat containing all of its original moisture in absorbed form, the steps of cooking comminuted meat without the addition of water at a temperature of from 150–212° F. for about 15–30 minutes which is insufficient to destroy the hemen, regrinding the meat to a finer size to cause the same to absorb its original juices, packing the meat and juice in a container together with about 6% of make-up water, sealing said container under vacuum, and processing the same in the absence of air at a temperature of about 240° F. to cause said meat to absorb said juices and to restore the hemen thereof to a pink color.

6. In a process for the preparation and packing of chopped meats, the steps of cooking comminuted meat without destroying the hemen thereof by heating the meat at a temperature between 150°–212° F. for about 15–30 minutes, packing the cooked meat with its juices in a sealed container, and processing the same under vacuum at a temperature of about 212°–240° F.

7. In a process for the preparation and packing of chopped meats, the steps of cooking comminuted meat without destroying the hemen thereof by heating the meat in the range of 170°–200° F. for about 15–30 minutes, regrinding the meat, mixing the same with its juices and processing the ground meat and juices in a sealed container under vacuum and at a temperature of about 212°–240° F.

8. In a process for the preparation and packing of chopped meats, the steps of coarsely grinding meat, cooking the meat without destroying the hemen thereof by heating the meat in the range between 150°–212° F. for about 15–30 minutes, regrinding the cooked meat to form a more finely comminuted material, mixing the juices resulting from the first cooking step with the reground material and processing the meat and its juices in a sealed container under vacuum at a temperature of about 212°–240° F.

ROBERT R. FULTON.

REFERENCES CITED

The following references are of record in the file of this patent:

UNITED STATES PATENTS

| Number | Name | Date |
| --- | --- | --- |
| 224,563 | Verhage | Feb. 17, 1888 |
| 1,240,165 | Balzari | Sept. 18, 1917 |
| 2,230,062 | Jordan | Jan. 28, 1941 |

FOREIGN PATENTS

| Number | Country | Date |
| --- | --- | --- |
| 326,849 | Great Britain | Mar. 21, 1930 |